(12) United States Patent
Cers

(10) Patent No.: US 10,442,359 B2
(45) Date of Patent: Oct. 15, 2019

(54) INSTANTLY SWITCHABLE SEE-THROUGH VEHICULAR REAR-VIEW MIRROR

(71) Applicant: Peteris Alberts Cers, Minneapolis, MN (US)

(72) Inventor: Peteris Alberts Cers, Minneapolis, MN (US)

( * ) Notice: Subject to any disclaimer, the term of this patent is extended or adjusted under 35 U.S.C. 154(b) by 0 days.

(21) Appl. No.: 15/792,497

(22) Filed: Oct. 24, 2017

(65) Prior Publication Data

US 2018/0056877 A1 Mar. 1, 2018

Related U.S. Application Data

(63) Continuation of application No. 15/155,132, filed on May 16, 2016, now Pat. No. 9,827,911.

(60) Provisional application No. 62/162,303, filed on May 15, 2015.

(51) Int. Cl.
*G02B 26/02* (2006.01)
*B60R 1/08* (2006.01)
*B60R 1/12* (2006.01)
*B60R 1/04* (2006.01)
*G02F 1/15* (2019.01)

(52) U.S. Cl.
CPC ............... *B60R 1/088* (2013.01); *B60R 1/04* (2013.01); *B60R 1/08* (2013.01); *B60R 1/12* (2013.01); *B60R 2001/1215* (2013.01); *G02F 1/15* (2013.01)

(58) Field of Classification Search
CPC .. B60R 1/12; B60R 1/04; B60R 1/087; B60R 1/088; B60R 2001/1215; G02B 26/04; G02B 1/14; G02B 2027/0118; G02B 2027/012; G02B 5/0858; G02F 1/15; G02F 1/153

USPC ......................................................... 359/236
See application file for complete search history.

(56) References Cited

U.S. PATENT DOCUMENTS 7,274,501 B2 * 9/2007 McCabe .................. B60R 1/12
359/245
7,684,105 B2 * 3/2010 Lamontagne ............. E06B 9/24
359/290

FOREIGN PATENT DOCUMENTS

| EP | 0106636 B1 | 1/1989 |
| EP | 0676085 B1 | 2/2002 |
| EP | 2008869 A1 | 12/2008 |
| JP | 2009056966 A | 3/2009 |

OTHER PUBLICATIONS

European Patent Application No. 16795983.2, Extended European Search Report dated Aug. 14, 2018, 7 pages.

(Continued)

*Primary Examiner* — Euncha P Cherry
(74) *Attorney, Agent, or Firm* — Fredrikson & Byron, P.A.

(57) ABSTRACT

An adjustable rearview mirror that is designed to quickly transition between transparent and reflective states. The apparatus is configured to resemble traditional rearview mirrors used in vehicles. The apparatus includes a window mount, a pivoting connection arm, and a user controlled mirror panel. The window mount connects the rearview mirror to the windshield of a vehicle. The pivoting connection arm enables a user to reposition the rearview mirror at will. The user controlled panel can be placed into a reflective or a transparent state based on user input. A user is able to gain a relatively unhindered view of traffic through a vehicle windshield.

23 Claims, 12 Drawing Sheets

(56) References Cited

OTHER PUBLICATIONS

International Patent Application No. PCT/IB2016/052838, International Search Report and Written Opinion dated Sep. 29, 2016, 5 pages.

* cited by examiner

INSTANTLY SWITCHABLE SEE-THROUGH VEHICULAR REAR-VIEW MIRROR

The current application is a continuation of U.S. non-provisional application Ser. No. 15/155,132 filed on May 16, 2016 which claims benefit of U.S. provisional patent application 62/162,303 filed on May 15, 2015.

FIELD OF THE INVENTION

The present invention relates generally to a micro structured glass pane, more particularly, to a display that an individual can quickly transition between a transparent and reflective surface. A user of the present invention will be presented with a rearview mirror that can be made sufficiently transparent upon request.

BACKGROUND OF THE INVENTION

There are many situations in which a driver encounters blockage of his forward field of vision by the rear-view mirror. The height of many drivers alone can put the rear-view mirror in their field of vision. The interior dimensions of compact and sub-compact cars put the rear-view mirror at obstruction level for even average sized drivers. Drivers bending down and around their rear-view mirror are a common sight, confirming that the rear-view mirror is often an obstacle to the clear vision required for safe driving. The rear-view mirror also becomes a vision obstacle when there is a difference in relative angle of the road surface of one driver's car to another. For example: if one's car is on a down slope and they are coming upon a flat intersecting roadway, that alone can cause the mirror to block the driver's direct line-of-sight of a vehicle approaching on the flat intersection from the right, or of a pedestrian in the walkway. This happens similarly when on an upslope, such as a cloverleaf up; one cannot see some of the cars that may be a bit farther up the cloverleaf in order to comfortably anticipate potential speed deceleration requirements.

This invention temporarily removes the main obstacle in a driver's forward field of vision—the center, windshield glass mounted, rear view mirror. This invention is switchable from a reflective, mirrored state, to an open clear state in under one second, and back, in less than one second. This invention will greatly increase driver effectiveness by taking away the largest windshield vision obstacle and is therefore a positive step towards road safety for all who travel in vehicles as driver or passenger, or as a pedestrian or bicyclist on the same roadway. It will also enhance scenery viewing while vacation driving adding to the driver's positive experience.

The micro-blinds exist in a naturally curled, transparent, state. However, the micro-blinds relax to their flat, closed, state in less than one second when an electric current is applied. Thereby returning the reflectivity of a mirror to the driver. Additionally, a phot-electric sensor is used to adjust the opacity of a dimming layer.

The "venetian" blind version adjusts the relationship of the blinds from flat to 90 degrees to the driver's angle of view with a small motor to go from a closed to open state and back. The dimming layer function is controlled with the photo-electric sensors in the rim to adjust the glare from the rear.

Additionally, the present invention uses suspended particle distribution (SPD) films, which function as light valves, to modify the transparency and reflectivity of the transition panel. In an SPD panel, millions of these SPDs are placed between two panels of glass or plastic, which is coated with a transparent conductive material. When electricity comes into contact with the SPDs via the conductive coating, they line up in a straight line and allow light to flow through. Once the electricity is taken away, they move back into a random pattern and block light. When the amount of voltage is decreased, the window darkens until it's completely dark after all electricity is taken away.

The present invention makes use of the novel micro-blind technology disclosed in U.S. Pat. No. 7,684,105B2. This Canadian micro-blind technology is a microstructured array of electrostatically actuated electrodes that transition from a cylindrical to a planar orientation when exposed to an electric voltage. To create the Canadian micro-blind a thin film of chromium, or other electrostatically stressed metal, is deposited onto a transparent conductive oxide (TCO) layer and then the stress metal is laser etched into a desired geometry. Using this manufacturing process, the Canadian micro-blind array is able to achieve closing (roll-down) times in the order of milliseconds and opening (roll-up) times under one second. The Canadian micro-blind is a low power technology which uses actuation voltages as low as 20-30V. The Canadian micro-blind is able to achieve rolled radii as small as 3 micrometers. Additionally, the TCO layer can be extremely thin. Thus, facilitating the creation of thin electro statically actuated panels that can transition from transparent to opaque in less than one second. The above described specifications of the Canadian micro-blind technology serve to elucidate the function of one possible embodiment of the micro-blind technology used in the present invention, and are not intended to limit the present invention.

DETAIL DESCRIPTIONS OF THE INVENTION

All illustrations of the drawings are for the purpose of describing selected versions of the present invention and are not intended to limit the scope of the present invention.

Figure 1:
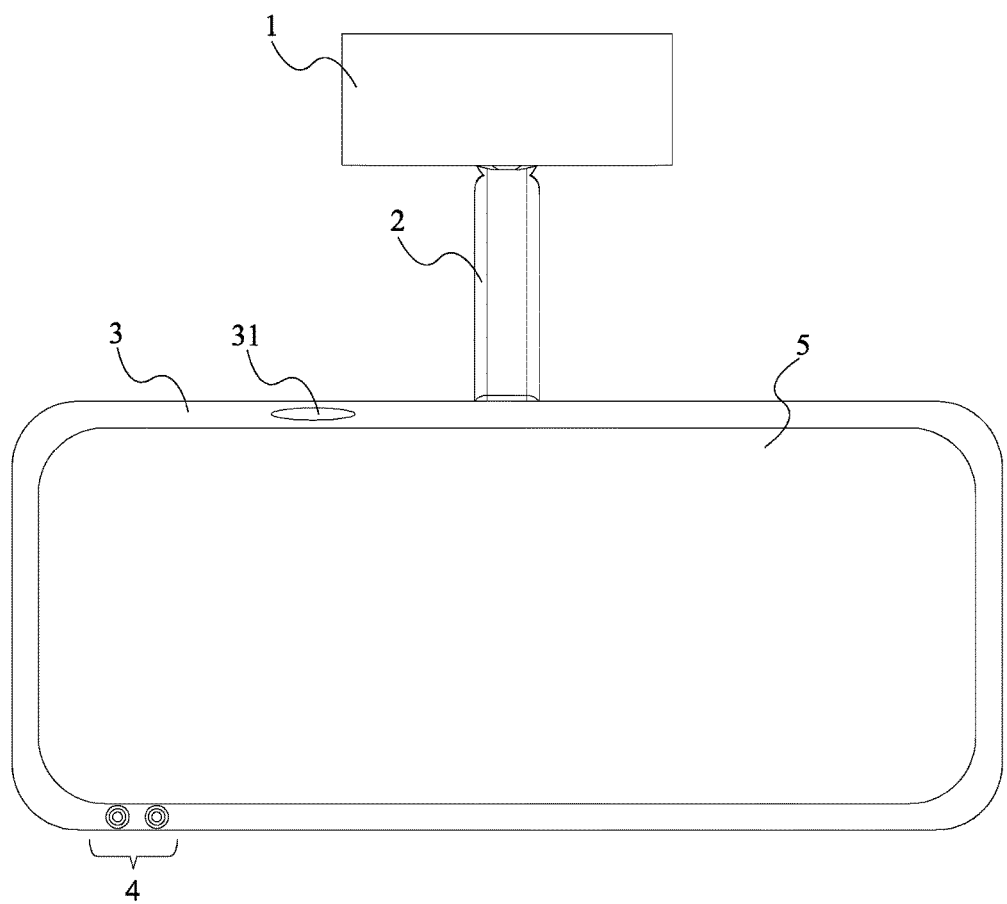
FIG. 1 is a front view of the present invention.

In reference to FIG. 1, the preferred embodiment of the present invention, the Instantly Switchable See-Through Vehicular Rear-View Mirror, is an electronically-controlled transitioning panel that makes use of stacked layers of modified panes of glass, or other rigid transparent material, to transition between a transparent and reflective viewing surface. The electronically-controlled transitioning panel comprises a control unit 1, a boom 2, a mirror frame 3, a control panel 4, and a transition panel 5. It is an aim of the present invention to provide an electronically-controlled transitioning panel which functions as a rear-view mirror when the transition panel 5 is in a reflective state. The present invention enables a user to switch the transition panel 5 between a transparent and a reflective state, by interacting with the control panel 4 on the mirror frame 3. In this way, the electronically-controlled transitioning panel acts as a rear-view mirror that grants a user an unobstructed field of view through their windshield, while in the transparent state. It is an aim of the present invention to provide an electronically-controlled transitioning panel that is repositionable similar to a traditional rear-view mirror. That is, the boom 2 is pivotably connected between the control unit 1 and mirror frame 3. The control unit 1 is mounted onto a windshield, and thus repositioning the boom 2 and mirror frame 3 enables a user to adjust the viewing area seen on the transition panel 5 while it is in the reflective state. In some embodiments, the control unit 1 is mounted onto the ceiling of the vehicle. In other embodiments, the control unit 1 is mounted onto the frame of the windshield. In these embodiments, the control unit 1 is mounted on locations which facilitate generating the largest possible unobstructed viewing angle.

Figure 2:
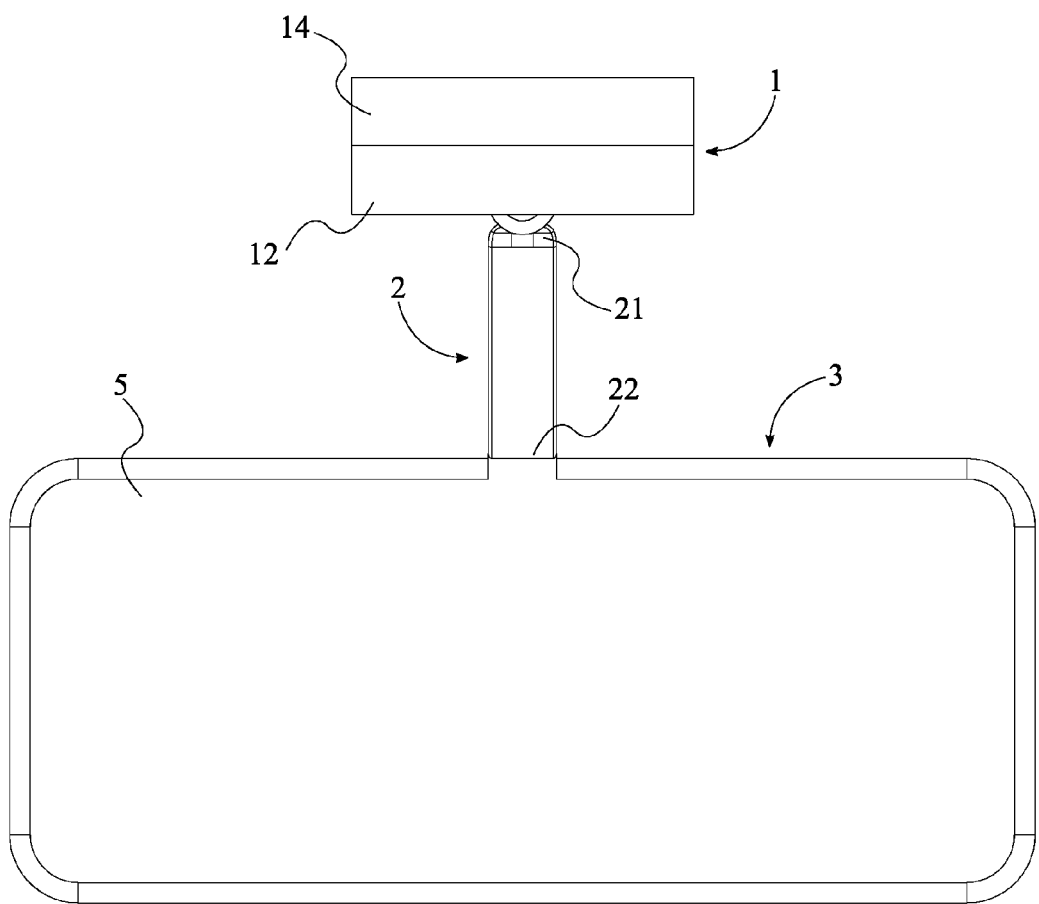
FIG. 2 is a rear view of the present invention.

In reference to FIG. 1 and FIG. 2, the control unit 1 functions as the central processor for the electronically-controlled transitioning panel. Additionally, the control unit 1 functions as the mounting mechanism that connects the electronically-controlled transitioning panel to the windshield of a vehicle. The control unit 1 comprises a microprocessor 11, a housing 12, and a window attachment mechanism 14. In the preferred embodiment of the present invention, the housing 12 is a rigid enclosure for the microprocessor 11. The microprocessor 11 is electronically connected to the transition panel 5, the mirror frame 3, and the remaining electronic components of the electronically-controlled transitioning panel. In the preferred embodiment of the present invention, the microprocessor 11 is electronically connected to the vehicle in which the electronically-controlled transitioning panel is mounted. As a result, electrical power is transferred to the electronically-controlled transitioning panel. Additionally, a user is able to govern the operation of the electronically-controlled transitioning panel by interacting with control panels 4 integrated into the steering wheel or other components of the vehicle in which the present invention is mounted. The window attachment mechanism 14 attaches the housing 12 to the windshield of a vehicle. In a supplementary embodiment, the window attachment mechanism 14 makes use of mechanical fasteners such as screws clamps, latches, and the like. In a separate embodiment, the window attachment mechanism 14 makes use adhesives to become attached to the windshield of a vehicle. In the preferred embodiment of the present invention, the housing 12 further comprises a display device 13. In this embodiment, the display device 13 is integrated into the housing 12 and electronically connected to the microprocessor 11. The display device 13 is located in a position which facilitates presenting a user with a clear view of pertinent system information, such as temperature, time, heading, and the like.

Figure 3:
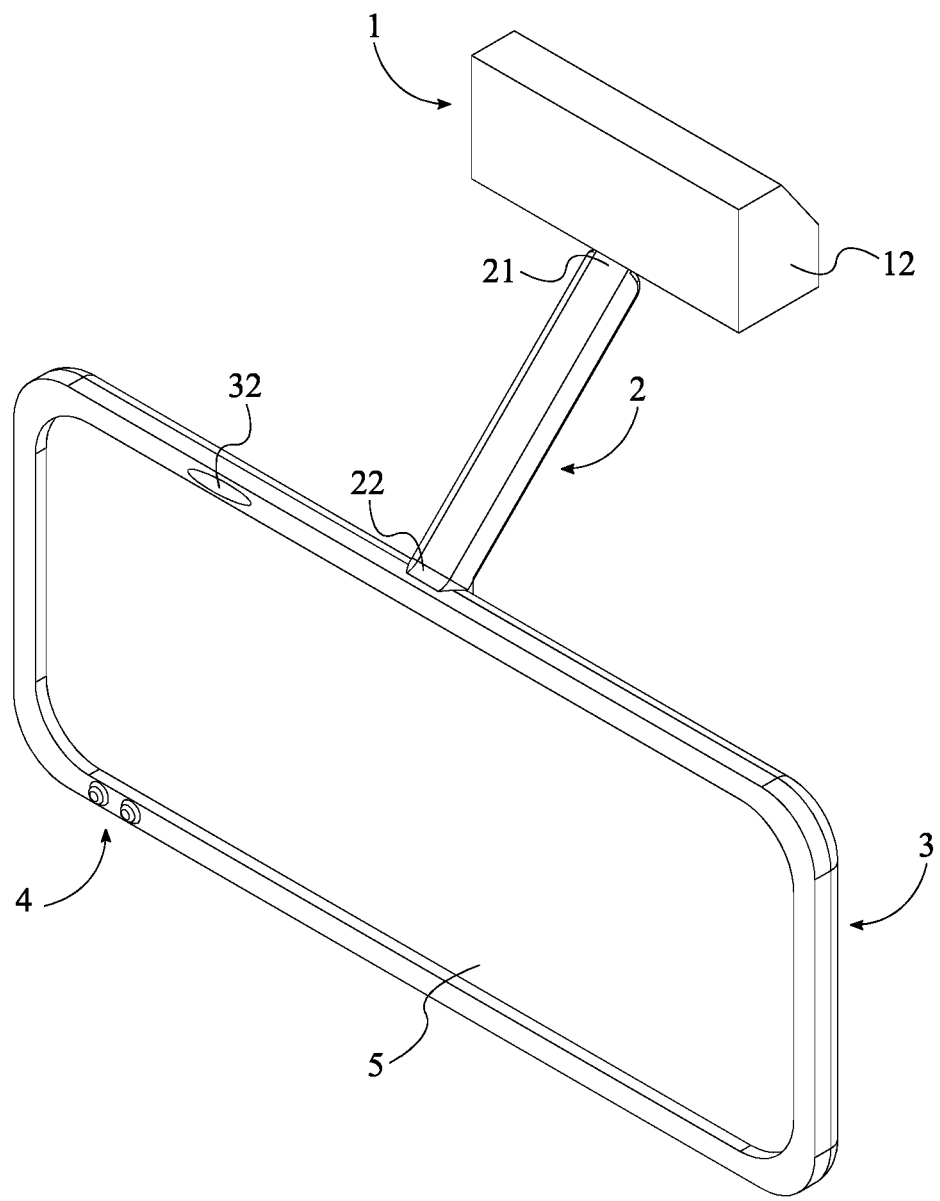
FIG. 3 is an isometric perspective view of the present invention.
Figure 4:
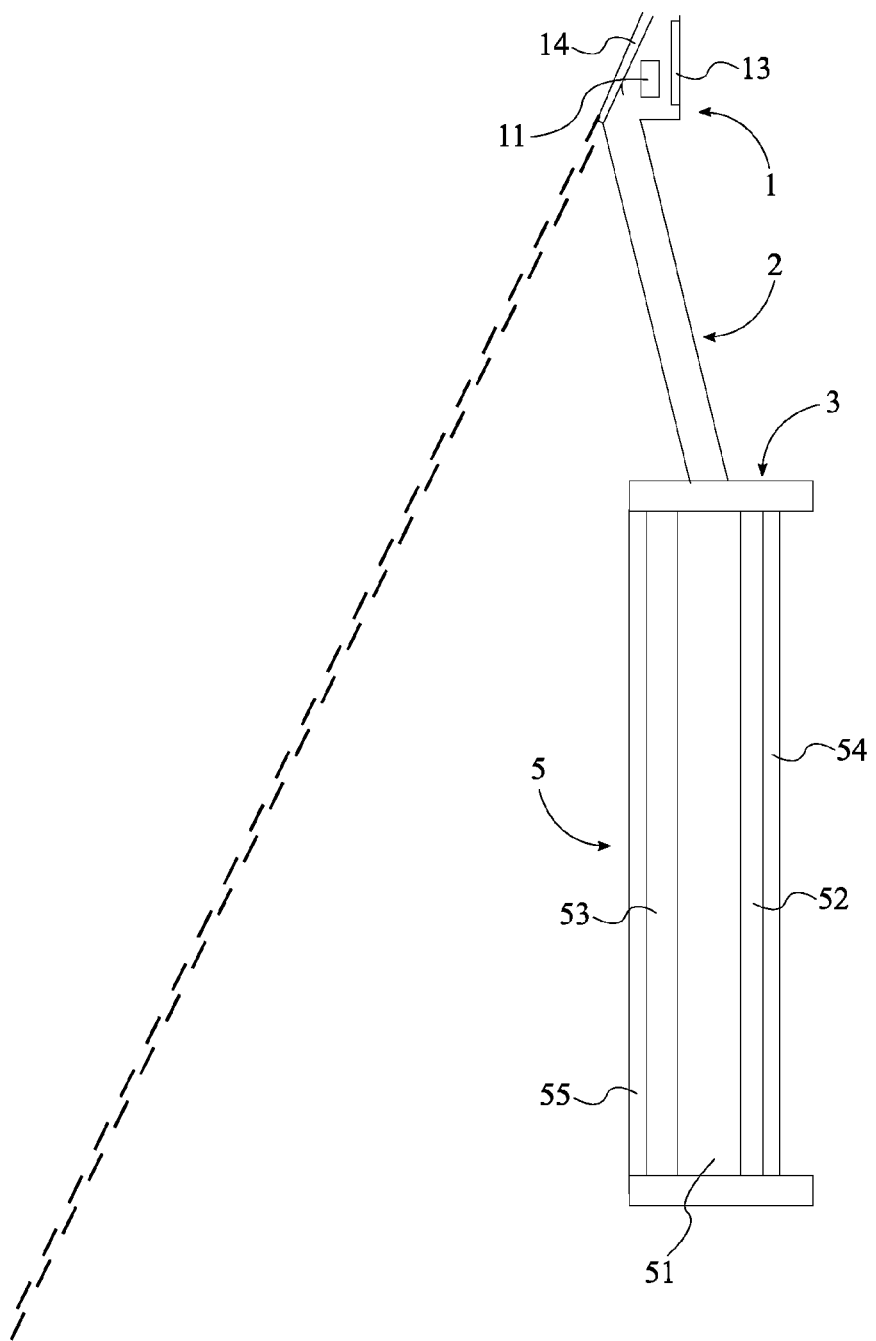
FIG. 4 is a right-side sectional view illustrating the components of one embodiment of the present invention.

In reference to FIG. 3 and FIG. 4, in the preferred embodiment of the present invention, the mirror frame 3 is a rigid frame that is perimetrically connected to the transition panel 5. It is an aim of the present invention to provide a mirror frame 3 that is pivotably connected to the housing 12 by the boom 2. That is, a first end 21 of the boom 2 is pivotably connected to the housing 12, while a second end 22 of the boom 2 is pivotably connected to the mirror frame 3, opposite the housing 12. The mirror frame 3 further comprises at least one environmental sensor 31 that is integrated into the mirror frame 3. Additionally, the control panel 4 is integrated into the mirror frame 3. In the preferred embodiment of the present invention, the control panel 4 is a collection of buttons which a user actuates to govern the operation of the electronically-controlled transitioning panel. In the present invention, the at least one environmental sensor 31 is a photodetector 32 that is positioned adjacent to the first transparent pane. The control panel 4 and the at least one environmental sensor 31 are electronically connected to the microprocessor 11.

In reference to FIG. 3 and FIG. 4, in the present invention, the transition panel 5 is an electronically controlled panel which a user directs to transition between a transparent state and a reflective state. The transition panel 5 comprises an adjustable optical blind 51, a front transparent pane 54, and a back transparent pane 55. The adjustable optical blind 51 is positioned in between the front transparent pane 54 and the back transparent pane 55. In the present invention, the transition panel 5 is electronically connected to the microprocessor 11. It is an aim of the present invention to provide an intelligent transition panel 5 that automatically reduces the amount of light reflected towards a user. This is accomplished through the use of a first adjustable opacity pane 52 that is positioned between the front transparent pane 54 and the adjustable optical blind 51. The first adjustable opacity pane 52 is a pane with an electrochromic device whose opacity is modified by electronic signals generated by the control panel 4 in response to varying intensities of light detected by the photodetector 32. That is, the opacity of the first adjustable opacity pane 52 is modified to in response to light of varying intensity. This feature prevents a user of the electronically-controlled transitioning panel from being blinded by the headlights of a trailing vehicle. The transition panel 5 further comprises a second adjustable opacity pane 53 that is positioned in between the back transparent pane 55 and the adjustable optical blind 51. The second adjustable opacity pane 53 becomes opaque when the adjustable optical blind 51 is in the reflective state. In this way, light is prevented from passing through gaps in the adjustable optical blind 51. Similar to the first adjustable opacity pane 52, the second adjustable opacity pane 53 is an electrochromic device whose opacity is controlled by the microprocessor 11. Additional embodiments of the present invention use LCD panels, suspended particle distribution panels, photochromic panels, and the like as a first adjustable opacity pane 52 and a second adjustable opacity pane 53.

Figure 6:
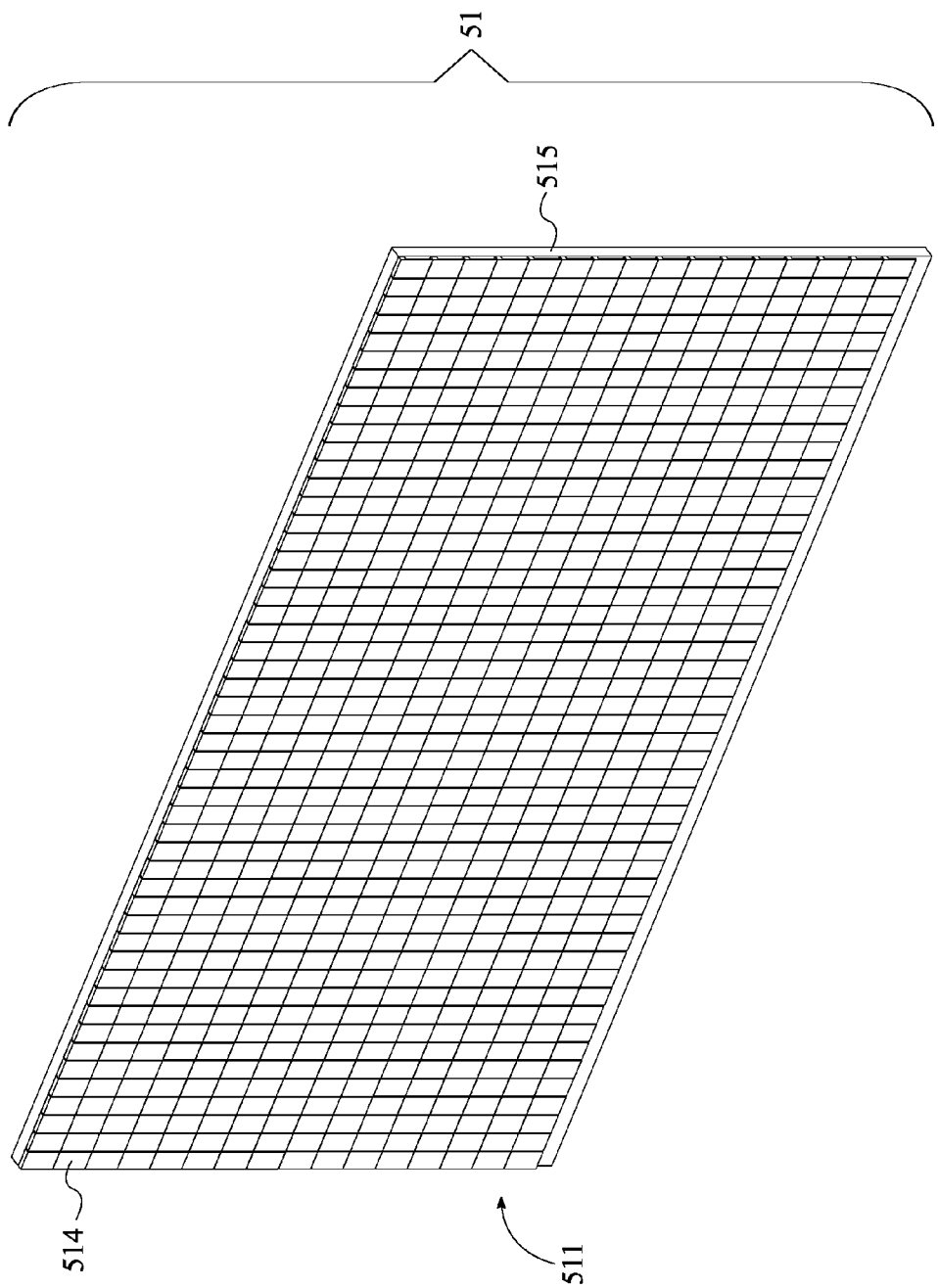
FIG. 6 is a perspective view illustrating the adjustable optical blind used in one embodiment of the present invention. In this embodiment, each of the plurality of micro-blinds is designed with a piezo electric blind body that is a single tab.
Figure 7:
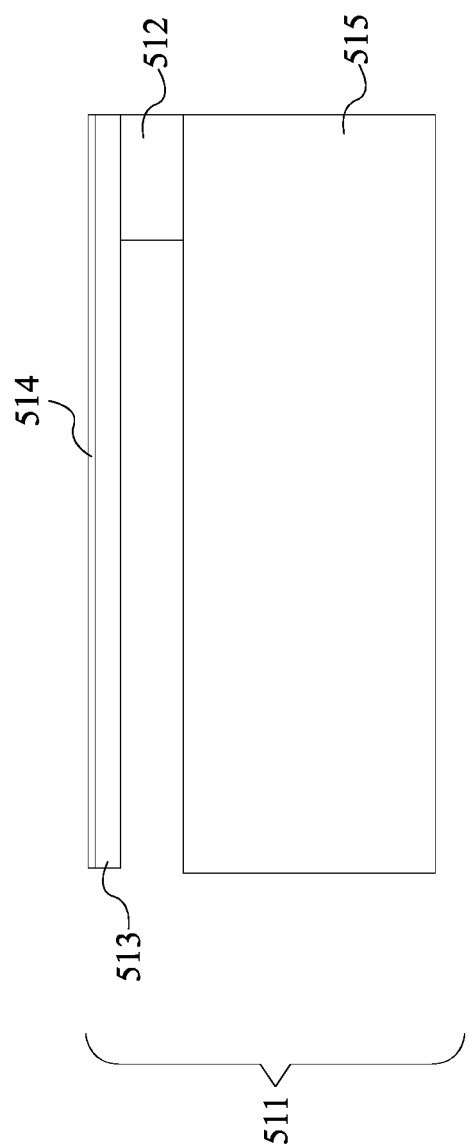
FIG. 7 is a side view of a single micro-blind included in the plurality of micro-blinds used in the present invention.

In reference to FIG. 1, FIG. 6, and FIG. 7, the adjustable optical blind 51 is a panel with mechanical components which transition between a closed and an open configuration. The adjustable optical blind 51 comprises a plurality of micro-blinds 511, and a transparent base pane 515. In the closed configuration, the adjustable optical blind 51 forms a reflective surface, that places the electronically-controlled transitioning panel in a reflective state. Conversely, in the open configuration the adjustable optical blind 51 is a transparent pane, that places the electronically-controlled transitioning panel in a transparent state. Each of the plurality of micro-blinds 511 comprises a fixed terminal 512, a piezoelectric blind body 513, and a reflective coating 514. The plurality of micro-blinds 511 is distributed across the surface of the transparent base pane 515, such that the fixed terminal 512 of each micro-blind is adjacently connected to the transparent base pane 515. The piezoelectric blind body 513 of each micro-blind is connected to the fixed terminal 512, opposite the transparent base pane 515. The reflective coating 514 is superimposed onto the piezoelectric blind body 513, opposite the fixed terminal 512. The piezoelectric blind body 513 is electrically connected to the microprocessor 11, through the fixed terminal 512. In some embodiments, the piezoelectric blind body 513 is a continuous strip. In separate embodiments, the piezoelectric blind body 513 is a series of tabs. In these embodiments, each of the plurality of micro-blinds 511 is positioned parallel to one another on the surface of the transparent base pane 515. In the present invention, micro-blinds are piezoelectric electrodes whose shape is modified by the application of an electrical current supplied by the microprocessor 11. That is, when the plurality of micro-blinds 511 is in the closed configuration the piezoelectric blind body 513 becomes a planar surface that is parallel to the transparent base pane 515. In this configuration, the reflective coating 514 is oriented towards the front transparent pane 54. When the plurality of micro-blinds 511 is in the open configuration the piezoelectric blind body 513 is coiled towards the fixed terminal 512. In some embodiments, the transition panel 5 uses multiple stacked layers of plurality of micro-blinds 51. In this embodiment, the plurality of micro-blinds 51 in each layer are positioned to cover gaps between the electrodes in the complementary layers of pluralities of micro-blinds 51.

Figure 8:
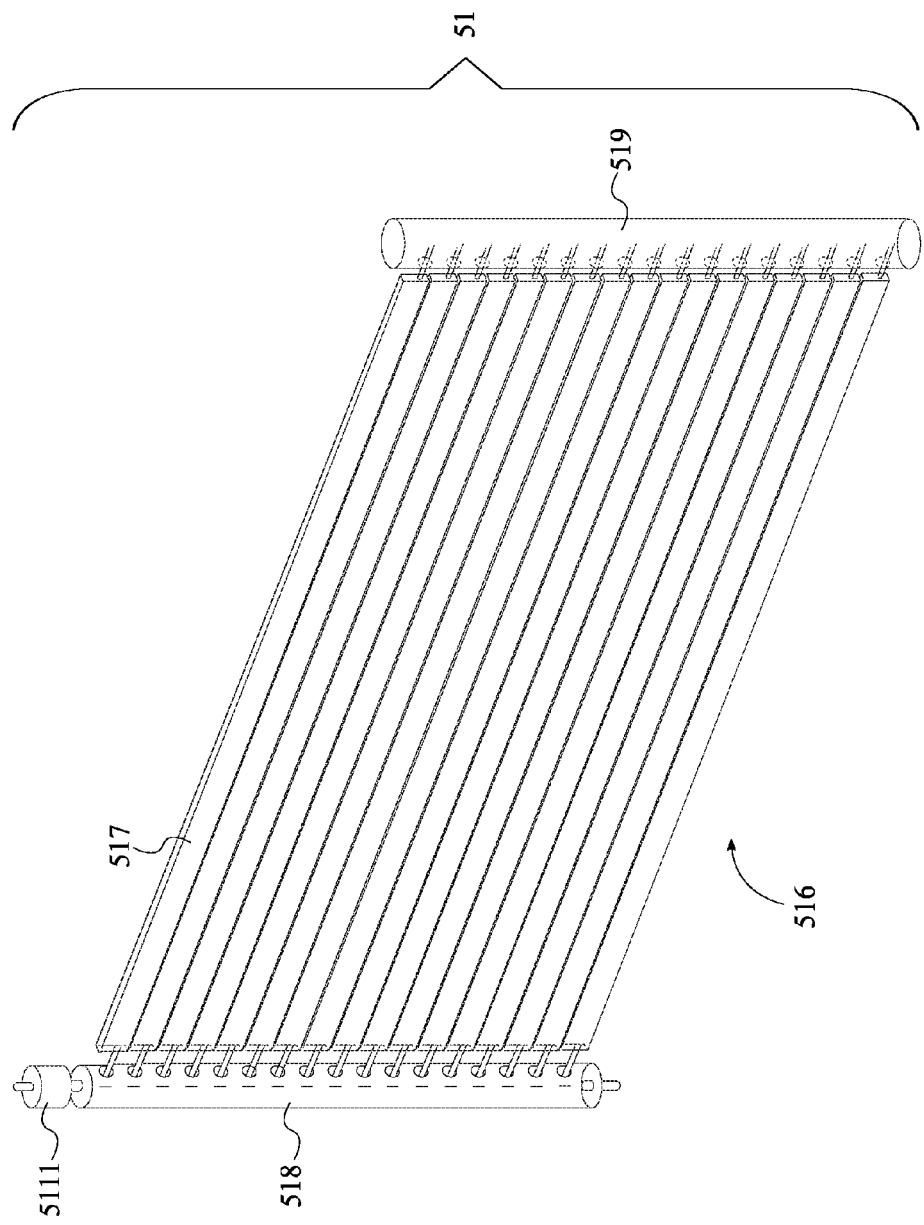
FIG. 8 is a perspective view illustrating the adjustable optical blind used in one embodiment of the present invention. In this embodiment, each of a plurality of slats is actuated by a first actuation mechanism.

In reference to FIG. 8, in a separate embodiment the adjustable optical blind 51 is manufactured with a plurality of slats 516 that open and close similar to a Venetian blind. In this embodiment, the adjustable optical blind 51 comprises a plurality of slats 516, a plurality of reflective coatings 517, a first slat support 518, a second slat support 519, and a first actuation mechanism 5111. The adjustable optical blind 51 can transition between a closed configuration and an open configuration. That is, while in the closed configuration the plurality of slats 516 forms a reflective panel, placing the transition panel 5 into a reflective state. While in the open configuration, the adjustable optical blind 51 becomes transparent, placing the transition panel 5 into a transparent state. Each of the plurality of slats 516 is pivotably and adjacently connected to the first slat support 518. Additionally, each of the plurality of slats 516 is pivotably and adjacently connected to the second slat support 519, opposite the first slat support 518. In this embodiment, each of the plurality or slats 516 is oriented parallel to one another. In an alternative embodiment, the first actuation mechanism 5111 is a lever mechanism that moves the plurality of slats 516 between the open configuration and the closed configuration.

In reference to FIG. 4 and FIG. 8, the first actuation mechanism 5111 is integrated through the first slat support 518, such that the plurality of slats 516 is operatively coupled to the first actuation mechanism 5111. That is, the first actuation mechanism 5111 causes the plurality of slats 516 to pivot between the open and closed configurations. The first actuation mechanism 5111 is electronically connected to the microprocessor 11. Additionally, the first actuation mechanism 5111 actuates the plurality of slats 516 based upon control signals generated by the microprocessor 11. Each of the plurality of reflective coatings 517 is superimposed onto a corresponding slat from the plurality of slats 516. When the plurality of slats 516 is in the closed configuration the plurality of slats 516 is positioned parallel to the front transparent pane 54, and coplanar to one another. In this configuration, the plurality of reflective coatings 517 is oriented towards the front transparent pane 54. When the plurality of slats 516 is in the open configuration each of the plurality of slats 516 is positioned perpendicular to the front transparent pane 54.

Figure 9:
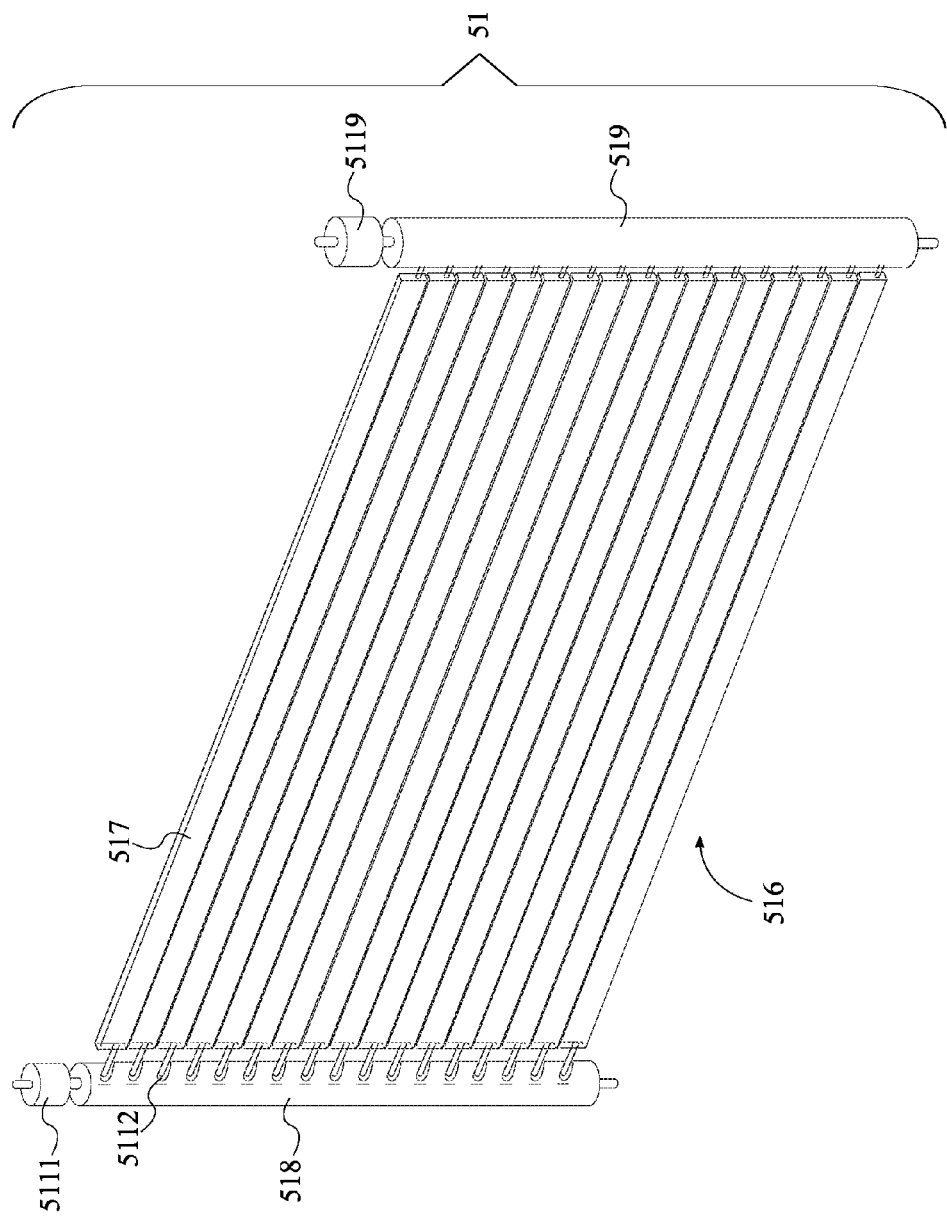
FIG. 9 is a perspective view illustrating the adjustable optical blind used in one embodiment of the present invention. In this embodiment, each of a plurality of slats is actuated along actuation tracks by a first actuation mechanism and a second actuation mechanism.

In reference to FIG. 9, in an additional embodiment of the present invention, the adjustable optical blind 51 is designed with a plurality of slats 516 that move between an open and a closed configuration along a semicircular track 5113. In this embodiment, the adjustable optical blind 51 comprises a plurality of slats 516, a plurality of reflective coatings 517, a first slat support 518, a second slat support 519, a first actuation mechanism 5111, and a second actuation mechanism 5119. Each of the plurality of slats 516 is slidably and adjacently connected to the first slat support 518. Additionally, each of the plurality of slat supports is slidably and adjacently connected to the second slat support 519, opposite the first slat support 518. In this embodiment, the plurality or slats are oriented parallel to one another. The first actuation mechanism 5111 is integrated through the first slat support 518, such that the plurality of slats 516 is operatively coupled to the first actuation mechanism 5111. The second actuation mechanism 5119 is integrated through the second slat support 519, such that the plurality of slats 516 is operatively coupled to the second actuation mechanism 5119. That is, the first actuation mechanism 5111 and second actuation mechanism 5119 cause the plurality of slats 516 to move between the open and closed configurations. Each of the plurality of reflective coatings 517 is superimposed onto a corresponding slat from the plurality of slats 516.

Figure 10:
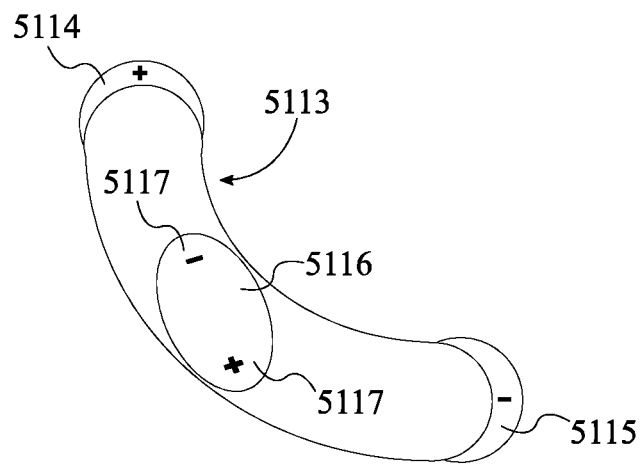
FIG. 10 is an illustrating of a single actuation track used in one embodiment of the present invention.
Figure 11:
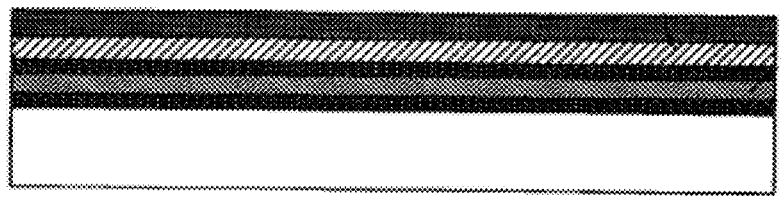
FIG. 11 is a side view illustrating the component layers of a micro-blind array found in U.S. Pat. No. 7,684,105B2. Embodiments of the present invention add supplementary layers which contain materials and technologies that augment the function of existing micro-blind structures.
Figure 11:
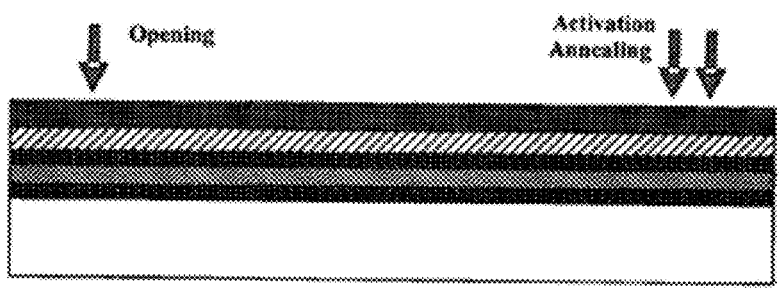
Figure 11:
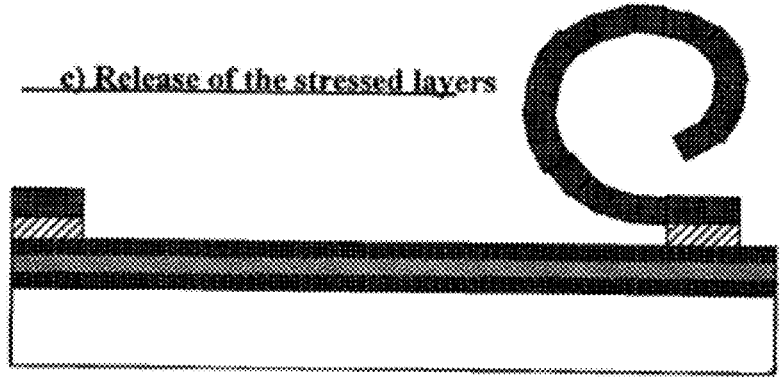
Figure 12:
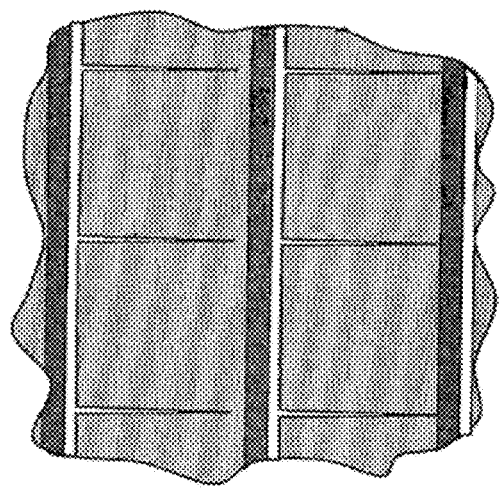
FIG. 12 is a top view illustrating the geometry of a micro-blind array in the open and closed positions. Additionally, this figure depicts the use of supplementary layers of material, technology, and deposition patterns to enhance the operation of the micro-blind array technology disclosed in U.S. Pat. No. 7,684,105B2.
Figure 12:
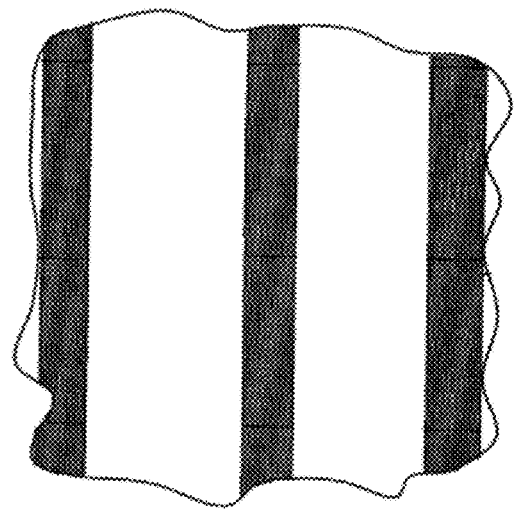

In reference to FIG. 9 and FIG. 10, the first actuation mechanism 5111 and the second actuation each comprise a plurality of actuation tracks 5112. The plurality of slats 516 slide between the open configuration and the closed configuration along the actuation tracks. Each of the plurality of actuation tracks 5112 comprises a semicircular track 5113 and an oblong-shaped pin 5116. The oblong-shaped pin 5116 is engaged along the semicircular track 5113 and comprises a pair of major vertices 5117. The semicircular track 5113 comprises a first track end 5114 and a second track end 5115. The plurality of actuation tracks 5112 use magnetic coupling as well as the first actuation mechanism 5111 and the second actuation mechanism 5119 to move the plurality of slats 516 between the open configuration and the closed configuration. To that end, the first track end 5114 and second track end 5115 are magnetically dipolar to each other. Similarly, the pair of major vertices 5117 are magnetically dipolar to each other. In this way, the magnetic polarities of the first track end 5114 and the second track end 5115 repel and attract the appropriately polarized vertices of the oblong-shaped pin 5116. The oblong-shaped pin 5116 for each of the plurality of actuation tracks 5112 of the first actuation mechanism 5111 is adjacently connected to a corresponding slat. Similarly, the oblong-shaped pin 5116 for each of the plurality of actuation tracks 5112 of the second actuation mechanism 5119 is adjacently connected to a corresponding slat.

Although the invention has been explained in relation to its preferred embodiment, it is to be understood that many other possible modifications and variations can be made without departing from the spirit and scope of the invention as hereinafter claimed.

What is claimed is:

1. An electronically-controlled transitioning panel for a rearview mirror comprising:
    a transition panel configured to move between a closed state and an open state, wherein the transition panel is transparent when in the open state and is opaque when in the closed state, wherein the closed state defines a reflective-mirrored state of the transition panel;
    the transition panel comprising an adjustable optical blind;
    the adjustable optical blind comprising a plurality of micro-blinds;
    each of the plurality of micro-blinds comprising a micro-blind body and a corresponding fixed terminal, wherein each micro-blind body is connected to the corresponding fixed terminal;
    each micro-blind body being configured to move between a closed configuration and an open configuration, wherein, when in the open configuration, each micro-blind body of the plurality of micro-blinds is coiled relative to the corresponding fixed terminal, and wherein, when in the closed configuration, each micro-blind body of the plurality of micro-blinds has a planar surface.

2. The electronically-controlled transitioning panel for the rearview mirror as claimed in claim 1 further comprising:
    a control unit comprising a microprocessor electronically connected to the transition panel.

3. The electronically-controlled transitioning panel for the rearview mirror as claimed in claim 2 further comprising:
    a control panel electronically connected to the microprocessor.

4. The electronically-controlled transitioning panel for the rearview mirror as claimed in claim 1 further comprising:
    a mirror frame;
    the mirror frame being perimetrically connected around the transition panel.

5. The electronically-controlled transitioning panel for the rearview mirror as claimed in claim 1 further comprising:
    a mirror frame perimetrically connected around the transition panel;
    a housing;
    a boom;
    a first end of the boom being pivotably and adjacently connected to the housing; and
    the mirror frame being pivotably and adjacently connected to a second end of the boom, opposite to the housing.

6. The electronically-controlled transitioning panel for the rearview mirror as claimed in claim 2 further comprising:
    a display device electronically connected to the microprocessor.

7. The electronically-controlled transitioning panel for the rearview mirror as claimed in claim 2 further comprising:
    a mirror frame perimetrically connected around the transition panel and at least one environmental sensor comprising a photodetector electronically connected to the microprocessor.

8. The electronically-controlled transitioning panel for the rearview mirror as claimed in claim 2 further comprising:
    a first adjustable opacity pane electronically connected to the microprocessor and positioned between a front transparent pane and the adjustable optical blind.

9. The electronically-controlled transitioning panel for the rearview mirror as claimed in claim 2 further comprising:
    a second adjustable opacity pane electronically connected to the microprocessor and positioned between a back transparent pane and the adjustable optical blind.

10. The electronically-controlled transitioning panel for the rearview mirror as claimed in claim 2 wherein the adjustable optical blind comprises stacked layers of the plurality of micro-blinds.

11. The electronically-controlled transitioning panel for the rearview mirror as claimed in claim 1 further comprising:
    each micro-blind body being a continuous strip or a series of tabs, each micro-blind body of the plurality of micro-blinds being positioned parallel to another micro-blind body of the plurality of micro-blinds.

12. An electronically-controlled transitioning panel for a rearview mirror comprising:
    a transition panel configured to move between a closed state and an open state, wherein the transition panel is transparent when in the open state and is opaque when in the closed state, wherein the closed state defines a reflective-mirrored state of the transition panel;
    the transition panel comprising an adjustable optical blind, wherein the adjustable optical blind comprises a plurality of micro-blinds, each of the plurality of micro-blinds comprising a micro-blind body, and wherein each micro-blind body is connected to a corresponding fixed terminal;
    the adjustable optical blind being configured to move between a closed configuration and an open configuration.

13. The electronically-controlled transitioning panel for the rearview mirror as claimed in claim 12 wherein, when in the open configuration, each micro-blind body of the plurality of micro-blinds is coiled relative to the corresponding fixed terminal and wherein, when in the closed configuration, each micro-blind body of the plurality of micro-blinds is not coiled relative to the corresponding fixed terminal.

14. The electronically-controlled transitioning panel for the rearview mirror as claimed in claim 12 further comprising a microprocessor electronically connected to the transition panel and wherein each micro-blind body moves between the open configuration and the closed configuration in response to an electrical output from the microprocessor.

15. The electronically-controlled transitioning panel for the rearview mirror as claimed in claim 14 further comprising a control panel and wherein the electrical output is controlled by the control panel.

16. The electronically-controlled transitioning panel for the rearview mirror as claimed in claim 15 wherein the electrical output is controlled by actuating at least one button of the control panel.

17. The electronically-controlled transitioning panel for the rearview mirror as claimed in claim 12 wherein the transition panel is mounted to a windshield of a vehicle.

18. The electronically-controlled transitioning panel for the rearview mirror as claimed in claim 12 wherein the transition panel is mounted to a windshield of a vehicle via a window attachment mechanism.

19. The electronically-controlled transitioning panel for the rearview mirror as claimed in claim 12 further comprising a display device, wherein the rearview mirror is mounted in a vehicle, the display device being configured to display system information of the vehicle and being located in the vehicle in a position which facilitates presenting a user with a clear view of the system information.

20. An electronically-controlled transitioning panel for a rearview mirror comprising:
- a transition panel configured to move between a closed state and an open state, wherein the transition panel is transparent when in the open state and is opaque when in the closed state, wherein the closed state defines a reflective-mirrored state of the transition panel;
- the transition panel comprising an adjustable optical blind, the adjustable optical blind being configured to move between a closed configuration and an open configuration;
- wherein the adjustable optical blind comprises a plurality of slats, the plurality of slats being configured to pivot between the closed configuration and the open configuration.

21. The electronically-controlled transitioning panel for the rearview mirror as claimed in claim 20 wherein the plurality of slats is positioned between a first slat support and a second slat support.

22. The electronically-controlled transitioning panel for the rearview mirror as claimed in claim 20 wherein each slat in the plurality of slats pivots between the closed configuration and the open configuration via an actuator.

23. The electronically-controlled transitioning panel for the rearview mirror as claimed in claim 1 wherein each micro-blind body is directly attached to a top of the corresponding fixed terminal.

\* \* \* \* \*

UNITED STATES PATENT AND TRADEMARK OFFICE
CERTIFICATE OF CORRECTION

PATENT NO. : 10,442,359 B2
APPLICATION NO. : 15/792497
DATED : October 15, 2019
INVENTOR(S) : Peteris Alberts Cers It is certified that error appears in the above-identified patent and that said Letters Patent is hereby corrected as shown below:

In the Specification

Column 1, Lines 54-55, Delete "current is applied. Thereby returning" and insert -- current is applied, thereby returning --

Column 1, Line 56, Delete "a phot-electric" and insert -- a photo-electric --

Column 4, Line 7, Delete "use adhesives" and insert -- use of adhesives --

Column 4, Line 55, Delete "modified to in response" and insert -- modified in response --

Figure 5:
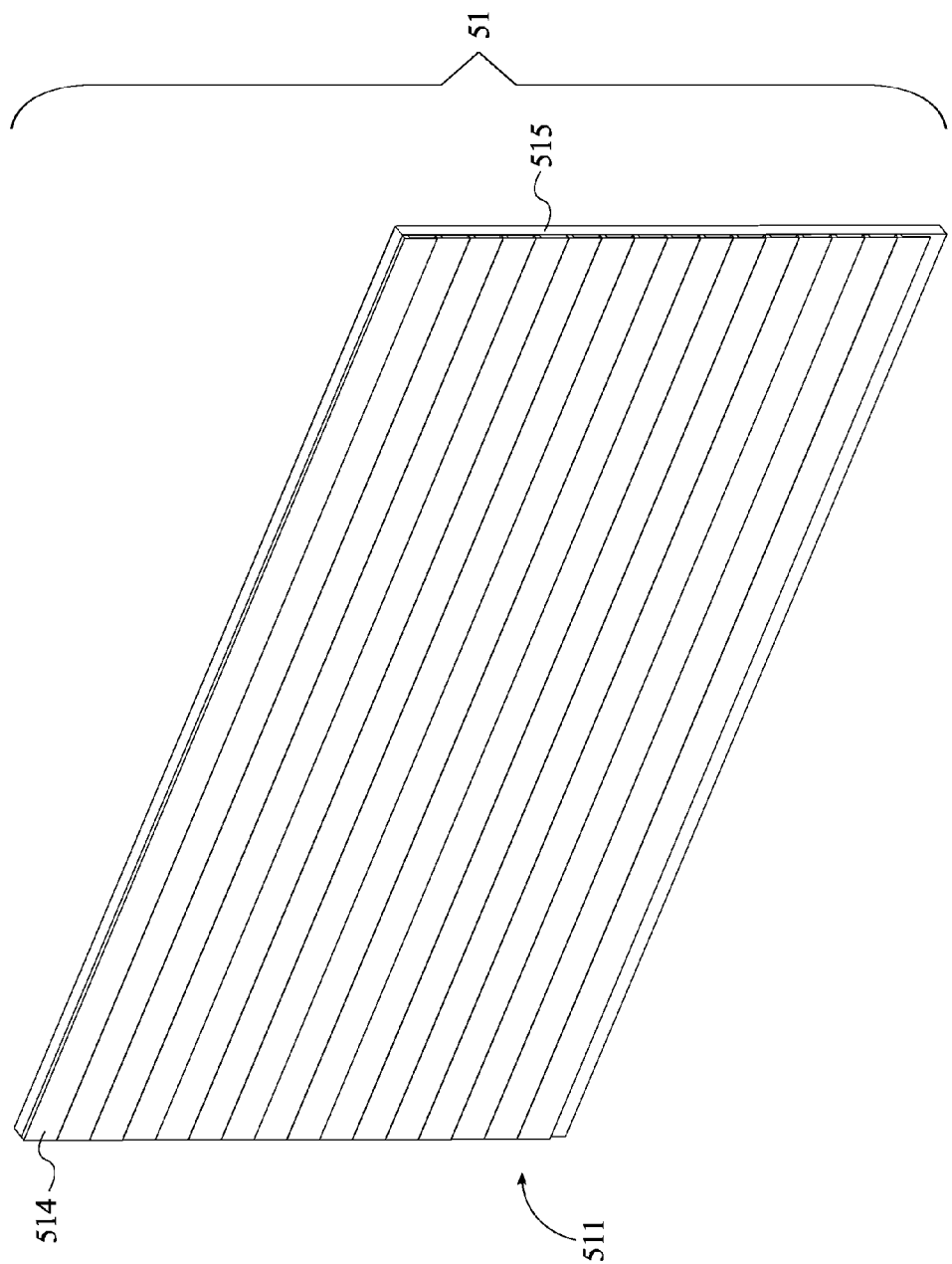
FIG. 5 is a perspective view illustrating the adjustable optical blind used in one embodiment of the present invention. In this embodiment, each of the plurality of micro-blinds is designed with a piezo electric blind body that is a continuous strip.

Column 5, Line 5, Delete "FIG. 1" and insert -- FIG. 5 --

Column 5, Line 66, Delete "plurality or slats" and insert -- plurality of slats --

Column 6, Line 34, Delete "slat supports" and insert -- slats 516 --

Column 6, Line 37, Delete "plurality or" and insert -- plurality of --

Column 6, Line 50, Delete "actuation each" and insert -- actuation mechanism 5119 each --

Signed and Sealed this
Tenth Day of March, 2020

Andrei Iancu
*Director of the United States Patent and Trademark Office*